Dec. 18, 1956 M. HUGHES 2,774,360
AUTOMATIC MOLD DEFROSTER
Filed Nov 30, 1953 5 Sheets-Sheet 1
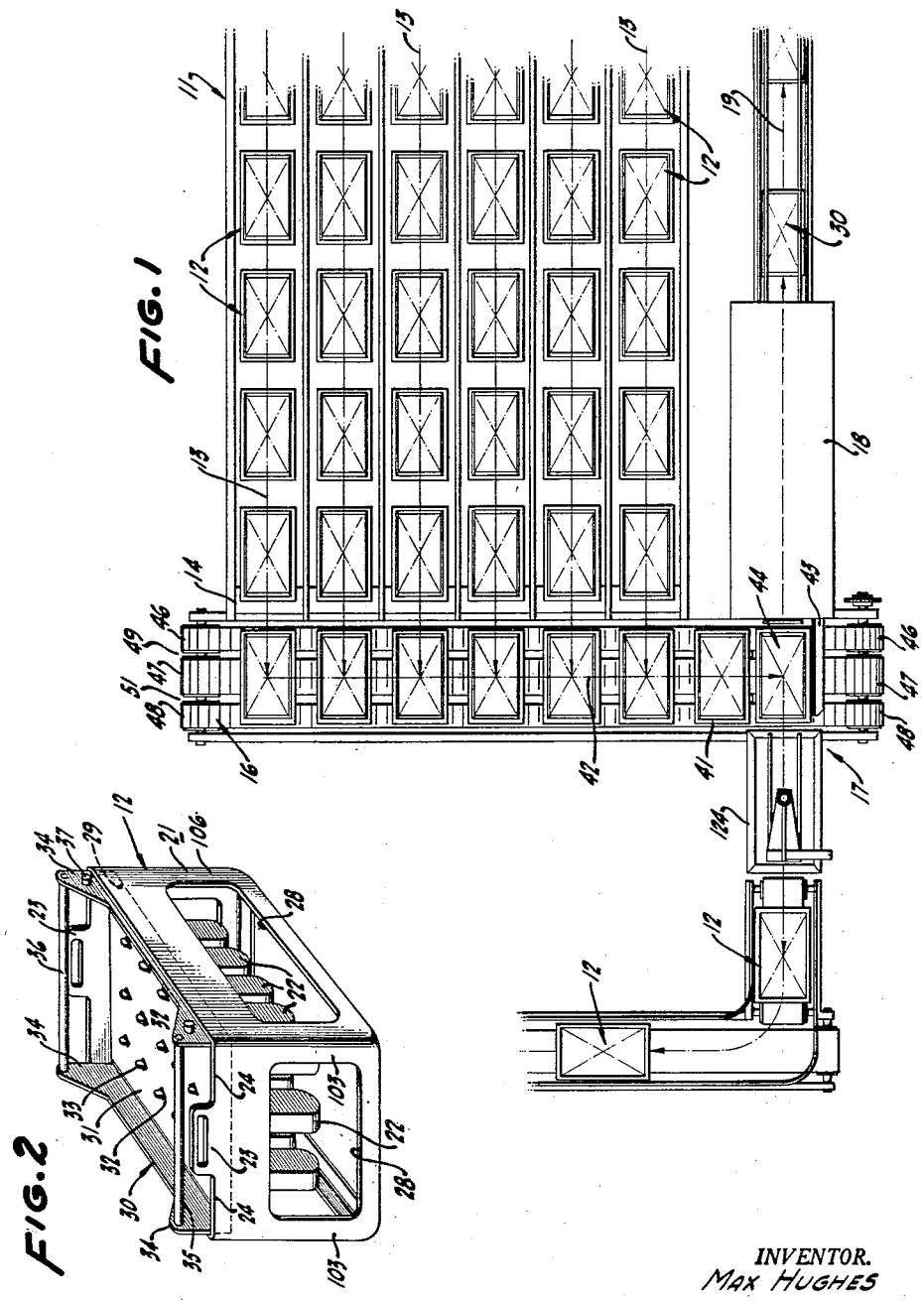
INVENTOR.
MAX HUGHES
BY
ATTORNEY

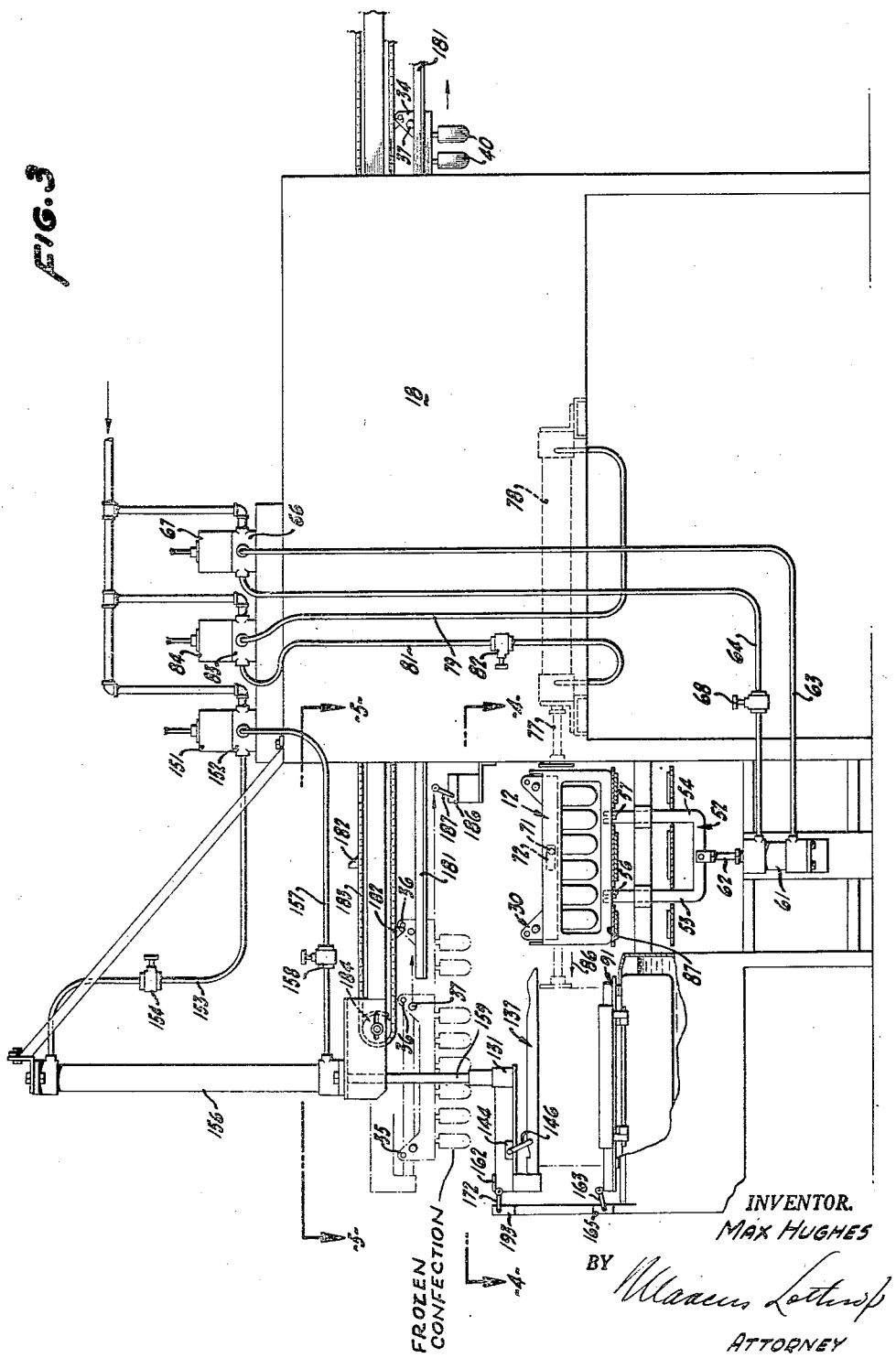

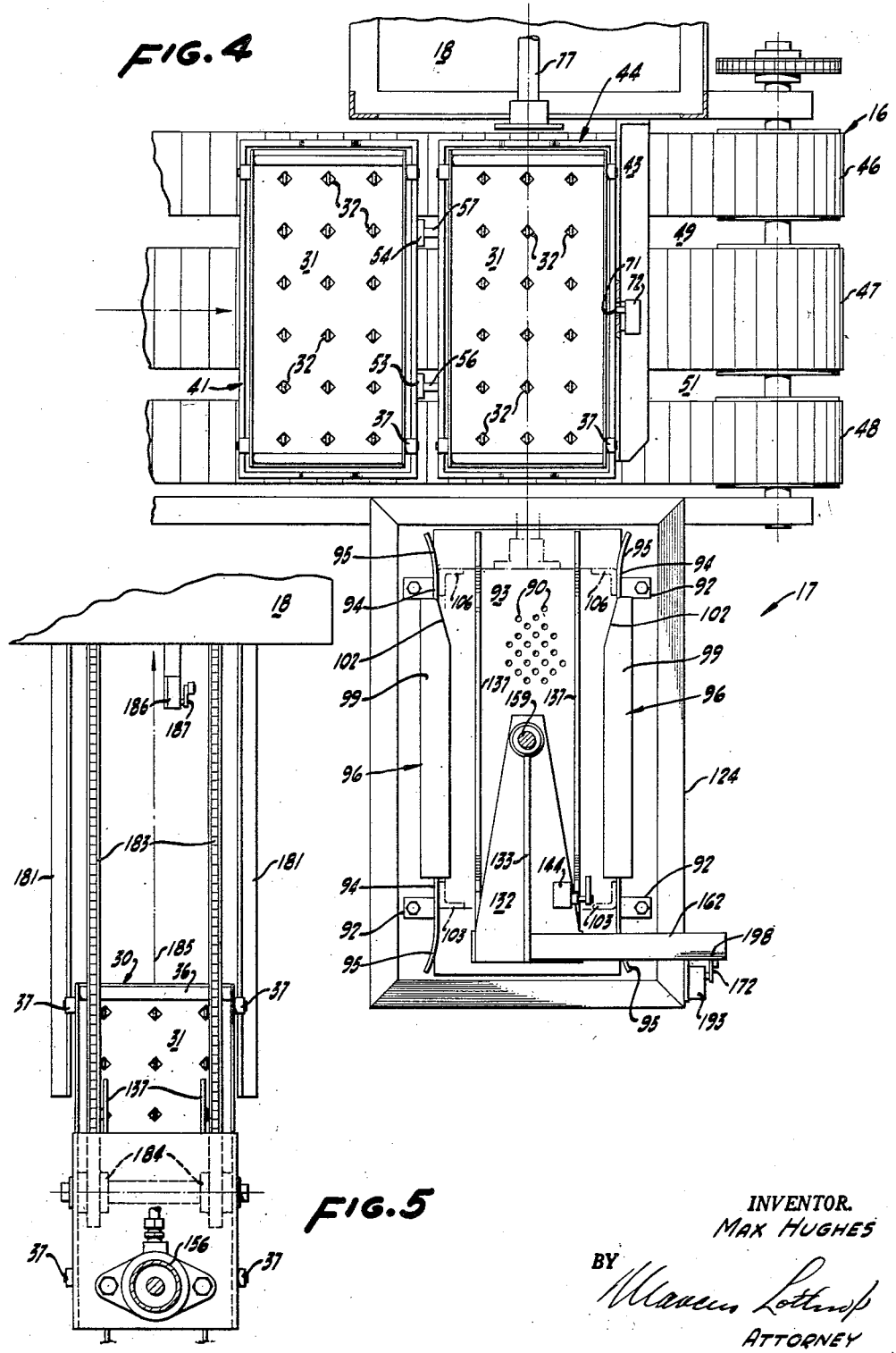

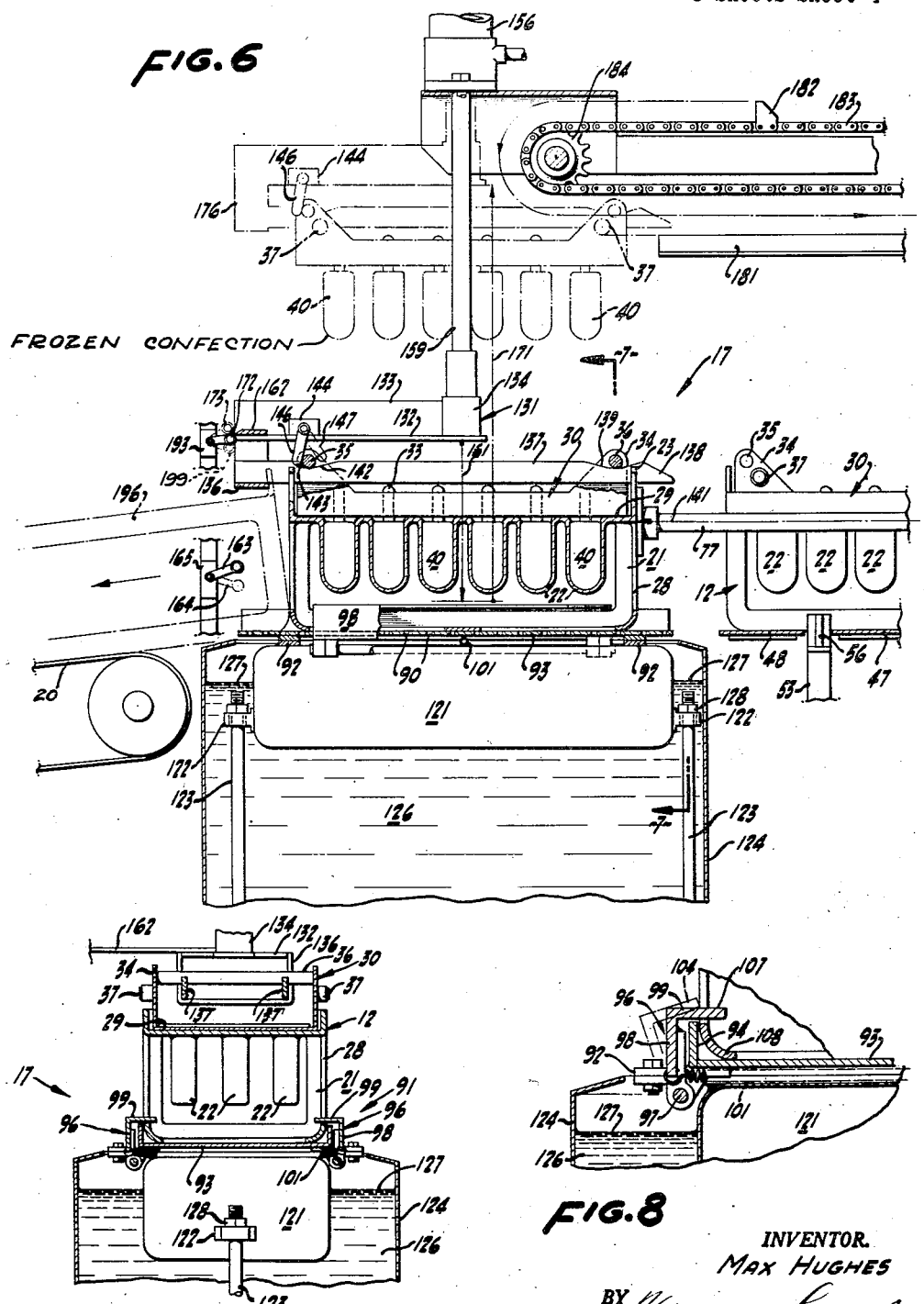

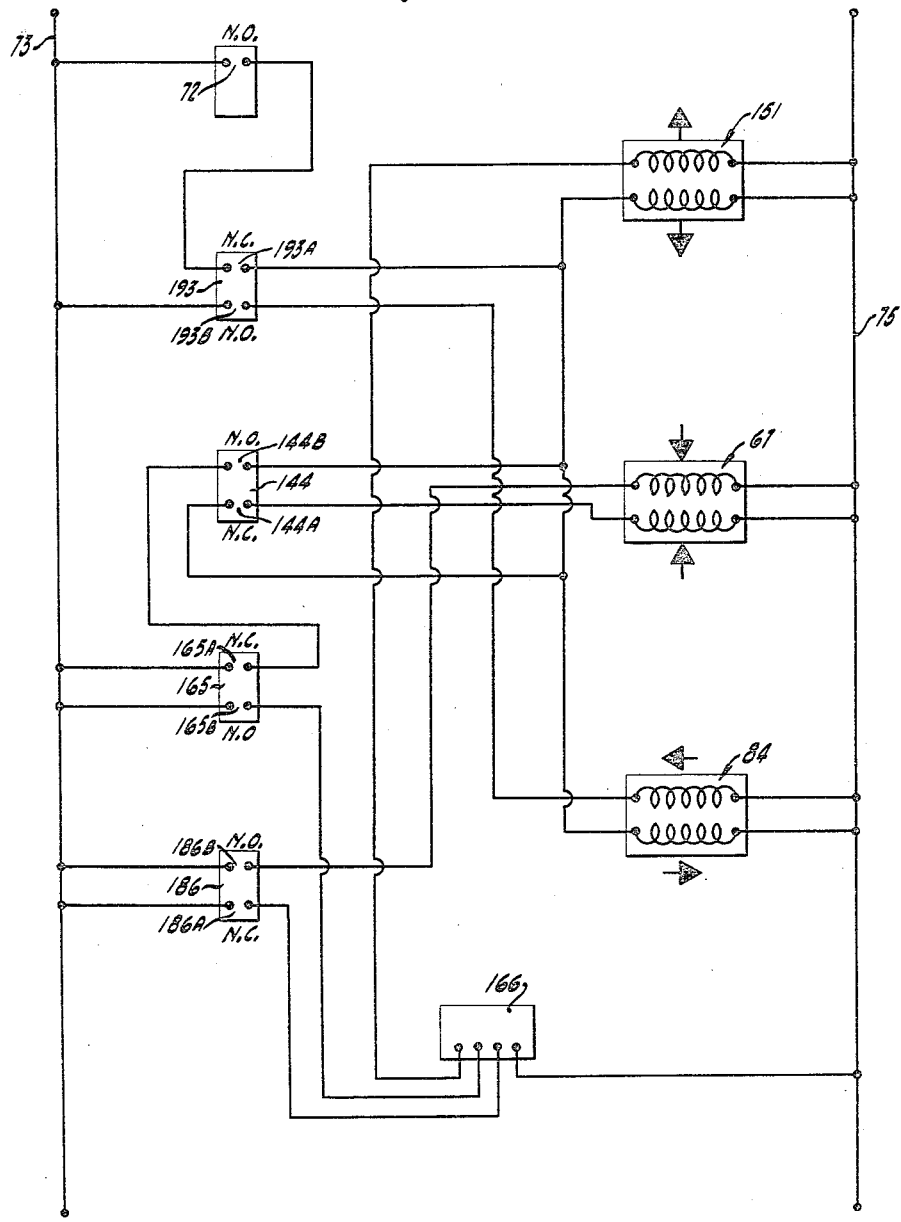

United States Patent Office 2,774,360
Patented Dec. 18, 1956

2,774,360

AUTOMATIC MOLD DEFROSTER

Max Hughes, West Sacramento, Calif.

Application November 30, 1953, Serial No. 394,938

8 Claims. (Cl. 134—46)

My invention relates to improvements in frozen confection equipment and especially to equipment for automatically defrosting frozen confection molds and separating the molds from the frozen confections formed therein.

In later years the production and sale of frozen confections, such as ice cream bars, water ices, frozen stick confections and related products, have greatly expanded. A substantial number of automatic units have been developed to freeze, process and package the confections, including mold pushers for brine tanks, conveyors and baggers.

Nevertheless, one of the key operations, the defrosting of the molds whereby the metallic mold and the frozen confections cast in the mold are immersed in a tank of warm water to break the icy bond between the mold and the confection to allow separation therebetween, has heretofore been performed by manually dipping the mold into the tank of warm water. The operator, in performing this step, has first had to move the mold to a position over the warm water tank and next immerse and hold the mold in the water for a few seconds to break the bond. Then he has had to lift the frozen confections from the mold, placing the confections on one conveyor and the mold on another conveyor, thence proceeding to the next confection mold for a repetition of these steps.

Manual operation at this key point has been accompanied by the usual disadvantages attending the human element in mass production. The problem is particularly acute where hygienic standards must be met and where, as in this case, the production of foods is involved.

The shorter the period of mold immersion, the smaller is the amount of melted confection film, and the "dryer" is the confection as it is removed from the mold. A "dry" confection is much to be desired, particularly where the product is to undergo further processing such as chocolate coating as by dipping; likewise, a "dry" confection will have less tendency to break down after bagging, causing the syrups or other ingredients in the confection to run onto the bag envelope with attendant bag weakening and stickiness. The optimum immersion time therefore is a period terminating just at the instant withdrawal of the confection can be effected without fracture of the confection. The strength required to effect confection withdrawal at this point, however, is considerable. As a result, the tendency is for an operator to wait longer than the optimum time, for the longer he waits the easier it is to separate the confection from the mold. This procedure, however, causes excessive and wasteful melting of the film and an undesirable "wetness" of the confection. So also, just as the strength of different operators varies, there is a variation in the judgment of different individuals. One operator may believe that three seconds is a proper period for mold immersion, whereas another may hold the mold in the water for perhaps twice that time, or even longer. As a result of this variation, the quality of the product with manual defrosting is subject to wide and undesirable fluctuations.

It is therefore an object of my invention to provide an automatic mold defroster eliminating the need for manual operation heretofore required.

It is another object of my invention to provide a mold defroster which is adaptable for use with existing frozen confection equipment.

It is yet another object of my invention to provide a mold defroster whose speed of operation can be regulated to conform to the necessary or desired rate of plant production.

It is a further object of my invention to provide a mold defroster which is sanitary and does not require an operator to stand over the defroster and manipulate the molds.

It is a still further object of my invention to provide a mold defroster which is not dependent upon manual operation and human strength to effect separation of frozen confections from their attendant molds nor upon the individual judgment of different operators as to the length of immersion interval for each mold.

It is another object of my invention to provide an automatic mold defroster useful not only in defrosting frozen confections of the stick type but all other commercial types as well.

Another object of my invention is to provide a mold defroster capable of exerting a mold and confection separating force substantially in excess of the force consistently exertable by an operator and which therefore results in a confection substantially "dryer" than that obtainable by manual defrosting.

A further object of my invention is to provide an automatic mold defroster capable of producing a product characterized by uniformity and excellence of quality.

Still another object of my invention is to provide a generally improved automatic mold defroster.

My invention is susceptible of numerous embodiments depending on the particular kind and type of frozen confection to be defrosted, and depending on the particular environmental structure with which the automatic defroster is to be used. An eminently satisfactory installation has been made and operated incorporating the embodiment described in the following description and illustrated in the accompanying drawings in which:

Figure 1 is a plan of an installation showing a brine tank, conveyors and automatic mold defroster, a portion of the figure being broken away to reduce the extent of the figure.

Figure 2 is a perspective of a frozen confection stick holder and mold.

Figure 3 is an elevation of the right side of the device shown in Figure 1.

Figure 4 is a plan, to an enlarged scale, along the plane indicated by the line 4—4 of Figure 3.

Figure 5 is a plan, to an enlarged scale, along the plane indicated by the line 5—5 of Figure 3, and showing a stick holder emerging from beneath the vertical air cylinder and mold carrier.

Figure 6 is a right side elevation, to an enlarged scale, of the defroster.

Figure 7 is a section along the plane indicated by the line 7—7 of Figure 6.

Figure 8 is an enlarged view of the left middle portion of Figure 7, a portion of the figure being broken away to reduce its extent.

Figure 9 is a schematic wiring diagram of the device.

In the commercial production of frozen confections, a large vat 11 or tank containing a chilled brine is frequently used to cool metallic molds 12, the molds having compartments therein filled with liquid confection, such as flavored water, ice cream mix, etc. Referring to Figure 1, the molds are filled at the right-hand side of the figure and are slowly transported through the cold brine toward the left, in the direction shown by the arrows 13, in a plurality of parallel rows.

As the molds proceed through the brine bath, the confection is progressively frozen and assumes in solid state the configuration of the mold compartments. As the molds reach the discharge end of the brine tank, an apron 14 leads the molds upwardly out of the brine and onto a conveyor 16 which transports the molds toward a mold defroster, generally designated 17.

Defrosting of the molds is an operation made necessary owing to the fact that as the confection freezes in the mold compartments, the outer layer of the confection adheres tightly to the compartment walls. Were an attempt to be made to remove the confection while tightly adhering to its mold compartment, the frozen confection would fracture or shatter, rendering the confection commercially useless.

To avoid this consequence, the mold is ordinarily immersed for a few seconds in a bath of warm water. This procedure causes the outermost layer or skin of the frozen confection to melt, thus breaking the bond between the mold compartment and the confection. Before this melted film congeals, the confection is extracted from the mold compartment and often undergoes subsequent treatment, as, for example, an additional freezing in a chilling chamber 18, thence onward to dipping, bagging, etc., in the direction shown by the arrow 19.

In the meantime the empty mold is directed onto a return conveyor 20 for transporation to a location near the mold filling equipment (not shown), for washing and re-filling.

The mold 12, as is seen most clearly in Figures 2, 6 and 7, comprises a box or crate-like frame 21, having a plurality of mold compartments 22 formed therein, opening upwardly for ease of filling. On the top of each end of the mold a handle 23 is conveniently provided, with shoulders 24 on each side of each handle. To facilitate free flow of brine around the mold compartments and consequent rapid chilling, the ends, bottom and sides of the mold box are cut away to form large openings 28. The end walls and side walls of the mold box extend upwardly beyond the top of the mold compartments to form a shallow pan 29 into which, after the compartments are filled with liquid confection, is placed, in the particular embodiment shown, a stick holder 30. It is to be clearly understood, however, that the automatic mold defroster of my invention is not restricted to use with stick types of confections alone, but is equally applicable to all kinds and types of frozen confections and frozen confection equipment.

Commercial stick holders assume many forms but a satisfactory type, as shown clearly in Figures 2, 4, 6 and 7, resembles a tray having a flat bottom 31 with a plurality of perforations 32 therein, each perforation being located for registry with a subjacent mold compartment. Wooden sticks 33, as are clearly shown in Figures 2 and 6, are inserted downwardly through the respective perforations and into the confection below. In commercial practice, mechanisms (not shown) for clamping the sticks to the stick holder are well known and no description of such mechanisms is deemed necessary. At each end of the stick holder a pair of upstanding ears 34 is provided, each pair of ears being joined by corresponding transverse rods 35 and 36, forming a pair of handles for the stick holder. Projecting outwardly from each ear, and slightly below the axis of the transverse rod, is a mold supporting pin 37.

The stick holder fits snugly into the shallow pan on top of the mold box and, as the stick holder and mold leave the brine bath, they are additionally held together by reason of the bond existing between the sticks and the frozen confections and by reason of the bond between the confections and their respective mold compartment walls.

By breaking the bond between the confections and their adjacent mold compartment walls and by overcoming the frictional fit between the stick holder and the mold pan, however, the stick holder 30 along with depending sticks and confections 40 can be separated as a unit from the mold itself, as clearly appears in outline in Figure 6.

I therefore provide apparatus for accomplishing automatically this unitary separation. As is clearly shown in Figure 1, the plurality of combined molds and stick holders, termed for convenience stick molds 41, are transported by the conveyor in the direction shown by arrows 42. Adjacent the end of the top run of the conveyor, as clearly appears in Figure 4, is a stop plate 43 against which the leading stick mold 44 abuts and stops. Succeeding stick molds continue to be carried by the conveyor toward the leading mold and upon abutment with the halted preceding molds are in turn brought to a stop.

In the embodiment shown, I prefer to defrost but one stick mold at a time. While I therefore provide mechanism for displacing from the conveyor a plurality of stick molds, I provide further mechanism for displacing only one stick mold at a time, in series or tandem arrangement, and for displacing each individual stick mold free from interference with the following stick mold.

Conveniently, the conveyor 16 comprises three separate belts 46, 47 and 48, with spaced portions 49 and 51 therebetween. As appears most clearly in Figures 3 and 4, a yoke 52 having a pair of Y-shaped arms 53 and 54 is disposed below the conveyor, the arms 53 and 54 projecting upwardly into the respective spaced portions 49 and 51 between the belts, and terminating at their upper ends in wedges, 56 and 57, respectively. As the yoke arms move upwardly, the wedges 56 and 57, located just below the line separating the first or leading stick mold from the second or following stick mold, bear against the following stick mold, urging it in a direction away from the first stick mold and maintaining this separation until well after the first mold has been laterally displaced from the conveyor belt.

Upward motion of the yoke arms is effected by suitable mechanism, as, for example, a cylinder 61 and plunger 62, actuated by compressed air from a high pressure air source (not shown). Hydraulic, air-hydraulic, or other kinds of plunger actuating mechanism would also be suitable, not only here but in any and all places in this description calling for an air cylinder. Outstroke piping 63 and instroke piping 64 connect the cylinder with a four-way valve 66 controlled by a double-acting solenoid 67. A flow control valve 68 is conveniently inserted in the instroke piping more nicely to adjust the instroke speed and operation of the plunger 62.

Abutment of the first or leading stick mold with a switch button 71 projecting slightly outwardly from the stop plate 43 toward the leading stick mold 44 triggers the upward yoke thrust, which, in turn, wedges apart the second stick mold from the first stick mold. A spring loaded switch 72, normally open, is closed as the first stick mold abuts the switch button 71. As appears most clearly in Figure 9, as the switch 72 is closed, electrical energy is allowed to flow from a line source 73 to a line sink 75 through an appropriate one of the solenoid coils in the double solenoid 67 which, in turn, actuates the valve 66 and directs high pressure air into the outstroke piping 63, thus forcing the plunger and yoke upwardly into mold separating and holding position.

Triggering of the switch 72 and separation of the leading stick mold from the subsequent stick molds is followed very soon by movement toward the left, as appears in Figure 3, of a horizontally disposed plunger 77 in a loading cylinder 78 having appropriate outstroke piping 79 and intake piping 81 with a flow control valve 82 therein, the piping terminating in a four-way valve 83 and an associated double-acting solenoid 84.

The plunger 77 abuts the leading stick mold and, as shown in Figure 3, pushes the stick mold toward the left, there being no interference of the leading stick mold with the succeeding stick mold owing to the separation of the molds provided by the upper ends of the yoke arms. So also, since the upper ends of the yoke arms project above the plane of the mold conveyor belt, the subsequent molds are held in position despite the frictional force of the belt, and thus the succeeding mold is not borne along the conveyor to impinge against and entangle with the outwardly projecting plunger 77.

As the leading stick mold moves toward the left, as indicated by the arrow 86 in Figure 3, the forward or leading bottom edge 87 of the mold leaves the belt and, after spanning a short gap to the left of the belt, advances onto a float platform 91, shown most clearly in Figures 4, 6, 7 and 8.

The float platform comprises a pair of lateral straps 92 to which is fastened a plate 93 for supporting the mold. The plate 93 has numerous perforations 90 therein to permit the free flow of water into and out of the opening on the bottom of the mold. Upstanding from transverse opposite sides of the plate is a pair of longitudinal mold guides 94, each guide flaring outwardly at each end, as seen most clearly in Figure 4. As the stick mold advances onto the float platform, the outwardly flared portion 95 of the guides directs the mold into proper transverse position on the float platform.

The mold is held firmly on the float platform by a pair of spring loaded jaws 96 or clamps rockably mounted on a pivot bar 97 extending longitudinally along each side of the float platform. A pair of channels fabricated from a springy steel could be conveniently utilized, but, in the embodiment shown, the jaws are formed from stiff angle iron having one of its legs 98 urged toward a substantially vertical position and the other of its legs 99 urged toward a substantially horizontal position. As appears most clearly in Figure 8, the jaws are urged toward each other by a tension spring 101 fastened to each of the jaw legs 98 at a location above the pivot bar 97, the fulcrum.

As is most clearly shown in Figure 4, each of the upper or horizontally tending jaw legs 99 has a beveled portion 102 on the leading end, or the end which first contacts the mold as the mold is pushed from the conveyor belt onto the float platform. Thus, as the flared portions 95 of the vertical guides 94 conduct the stick mold into abutment with the beveled leading ends 102 of the jaws, the leading vertical frame members 103 (see Figure 2) of the mold contact the jaws and rock or cam the jaws outwardly against the tension of the spring 101 to the position 104 shown in outline in Figure 8. The length or longitudinal dimension of each of the jaws is slightly less than the length of the corresponding opening 28 along the side of the mold. Thus, as the mold advances to its correct predetermined position on the platform, with the mold leading vertical frame members 103 and trailing vertical frame members 106 assuming the position shown in outline in Figure 4, the jaws are no longer held or cammed outwardly and are snapped inwardly by the spring, as appears most clearly in Figure 8, to a position 107. In position 107, the horizontal leg 99 of each jaw extends inwardly and over a corresponding longitudinal bottom member 108 of the mold, clamping the mold to the support plate 93 of the float platform and effectively restraining the mold against vertical translation with respect to the float platform.

The float platform is supported by and fastened to (by the lateral straps 92) a buoyant member 121 or float restricted to vertical translation by suitable guides, as, for example, a pair of collars 122 encompassing corresponding guide rods 123 mounted vertically on opposite sides of a tank 124 for containing warm water 126. By suitable mechanism (not shown) the water can be maintained at any desired temperature, within suitable tolerances, and also at a substantially fixed level 127. The water level 127 is preferably held to a height sufficient to hold a positive buoyancy on the float so that with a predetermined position of a stop nut 128 on the top end of the guide rod 123, the float's buoyancy exerts a positive upward force on the collar 122 in abutment with the stop nut 128. In this way, the float platform uniformly is positioned at a height in registry with the adjacent conveyor belt, a position conducive to ease and accuracy of translation of the mold as it is pushed from the conveyor belt onto the float platform.

Careful regulation of water level with respect to the downward stroke of the vertical plunger and carrier is also important in that at the bottom of the plunger stroke, the mold compartments should be entirely surrounded by the warm water for uniformity of melting of the confection bond layer, but not so far as to permit the warm fluid to flow over the sides of the mold pan 29 and leak onto the confections themselves.

At the same time the mold is advancing into engagement with the float platform, the attendant stick holder on top of the mold is sliding into engagement with what I term, for convenience, a mold carrier, generally designated 131.

The mold carrier assumes the form of a flattened hook and comprises on its top side a substantially horizontal upper plate 132 stiffened by a vertical spine 133. At one end of the plate a vertically disposed mounting collar 134 projects upwardly. At the other end of the plate and mounted on each side thereof is a U-shaped plate 136 projecting downwardly. From the inside opposite faces of the U-shaped plate and projecting substantially horizontally in a direction toward the collar 134 is a pair of carrier arms 137 or hook.

The carrier arms are substantially identical and each is conveniently fabricated from a metal strip or bar, the bar being mounted with its greater thickness in a vertical direction for maximum beam strength. The outer or free end 138 of each arm is beveled to contact and cam upwardly the advancing transverse rod 35 of the oncoming stick holder. Somewhat inwardly of the beveled end of the arm is a first groove 139, the groove being shallow so as to offer no substantial resistance to the advancing transverse rod 35 as the rod slides along the upper edge of the carrier arm.

As the stick mold continues to progress toward the left, as shown by the arrow 141 in Figure 6, the transverse rod 35 encounters a second groove 142 on the upper side of the arms and near the U-shaped plate 136. The second groove 142 has substantially the same depth as the first groove 139 but presents on its left margin a relatively sheer or vertical wall 143 against which the rod 35 abuts and stops. The grooves 139 and 142 are so spaced from each other longitudinally that each accommodates at the lowest portion of the grooves the corresponding transverse rods 36 and 35 of the stick holder.

In proper position, the carrier arms are disposed between the mold shoulders 24 on each end of the top of the mold and the two handles 35 and 36 of the stick holder. Thus, as the stick mold advances ahead of and is pushed by the loading plunger 77, not only is the mold positioned on the float platform 91 but the underside of the stick holder transverse rods or handles are hooked by the carrier arms.

A still further accomplishment is effected by the advancing mold. Mounted conveniently on the flat upper plate 132 of the mold carrier, substantially vertically above the groove 142, is a switch 144 having a spring loaded arm 146 swingable from a first position 147 (shown in outline in Figure 6) to the second position shown in full line in Figure 6 by reason of the force exerted on the arm by the leading handle 23 of the mold.

As appears in the wiring diagram, Figure 9, the switch 144 is of the double-pole, double-throw type. In the switch 144, when the spring is in control, a lower pair of contacts, designated 144A, are closed, whereas an upper pair of contacts, designated 144B, are open.

For convenience in tracing all the circuits, when the switch springs are in control, the contacts which are closed are termed "normally closed" and designated on Figure 9 by N. C., while the contacts which are open when under spring control are termed "normally open" and designated by N. O.

Since the advance of the mold overcomes the force of the spring in the switch 144, the spring is no longer in control and the connections normally obtaining in the switch 144 are reversed. That is to say, the contacts 144B are closed and current is allowed to flow to an appropriately acting solenoid coil in a double-acting solenoid 151 controlling a four-way valve 152 from which lead outstroke piping 153, having a flow control valve 154, to the upper end of a cylinder 156, and instroke piping 157, with a flow control valve 158, to the lower end of the cylinder 156. Vertically reciprocable in the cylinder is a plunger 159 having rigidly mounted on the bottom thereof, as clearly appears in Figure 3, the mold carrier 131 disposed with its arms facing in the direction of the oncoming molds.

The closing of contacts 144B causes air to flow into the outstroke piping and consequently, the plunger is ejected downwardly, and thus forces the mold carrier downwardly from its mold loading position. As the mold carrier continues its downward motion, the lower edges of the carrier arms 137 bear downwardly against the mold shoulders 24 and exert an overcoming downward force against the upward buoyancy of the float.

When the mold has traveled downwardly from loading position to a position where the water level (slightly higher than the original level 127 owing to the increased displacement of the float) is substantially at the top of the mold compartments, that is, a distance approximately as shown by the arrow 161 in Figure 6, a switch bar 162 (shown most clearly in Figure 4) projecting transversely and outwardly from the top of the flat plate 132 of the mold carrier contacts a spring loaded switch arm 163, as clearly appears in Figure 6, depressing the arm to the position 164, shown in outline, and reversing the "normal" or spring controlled connections of the contacts of the attendant switch 165.

The switch 165 has, as seen by reference to Figure 9, a pair of normally closed contacts 165A and of normally open contacts 165B. By reversing the normal connections, therefore, the switch bar 162 opens contacts 165A and therefore opens and de-energizes the circuit causing air to flow into the upper side of the vertical plunger 159. In this situation the solenoid 151 returns the valve to a neutral position, entrapping air on both sides of the plunger piston and not only halting further downward motion of the plunger but holding the plunger in the stopped position.

Reversal of the switch 165 effects also the closing of contacts 165B, resulting in energization of a timer 166. The timer is of the kind customarily found on the shelves of electric or electronic supply houses and it is felt that no particular comment need be made concerning its structure or operation except to state that the timer is of the type that permits a number of time intervals to be set by a knob or dial on the timer and at the end of the particular preset interval, internal contacts close and cause current to flow in a separate circuit. Thus, in the embodiment illustrated, the mold compartments are immersed for a predetermined desired length of time and at the end of the time, the appropriate one of the coils in solenoid 151 is again activated to produce an appropriate opening of the valve 152 to permit air to flow into the instroke piping, with attendant withdrawal or upward motion of the plunger 159. In Figure 9, each of the arrows shown adjacent each solenoid coil or winding (shown schematically) represents the direction of the plunger attending the activation of the corresponding solenoid coil.

The time interval to be set on the timer 166 depends on a number of factors, and includes the temperature of the mold compartments and confections therein, the temperature of the fluid bath and the characteristics of the particular confection. Assuming these and other factors to be constant, the proper time for any particular run can be quickly ascertained by successive approximations, two or three being usually sufficient. As a first approximation, a time interval of four seconds can conveniently be set on the timer.

At the conclusion of the time interval as described above the plunger rises, lifting with it the mold carrier through the distance indicated approximately by the arrow 171. As the mold carrier rises, the switch bar 162 departs from the switch arm 163, permitting the arm 163 to return to normal, spring-controlled position. As the switch bar 162 sweeps upwardly it abuts against a switch arm 172 in the position normally assumed by the arm 172 under spring control (and shown in full line in Figure 6). The switch bar deflects the arm 172 upwardly to the position shown in outline and designated as 173 and continues to sweep upwardly, allowing the spring to return the arm to its normal position 172. The slight upward deflection from position 172 to 173 and back to 172 produces no change in any contacts or any circuits, an appropriate switch being selected for this purpose.

The plunger and mold carrier continue to rise and come to rest in a top-most position designated 176 and shown in outline in Figure 6. During the course of the upward travel of the plunger, separation of the mold and stick holder (with the depending confections 40) has come about. During the initial portion of the upward travel of the plunger and the carrier arms the mold also moved upwardly as a result of the upward buoyant force exerted on the mold by the float and float platform. As soon, however, as the collars 122 are brought to a halt by the stop nuts 128, any further upward movement of the mold, owing to any residual frictional bond between confection and mold compartment, or between mold pan and stick holder, is brought to a stop by the jaws 96 which confine the mold and restrict it against further additional upward movement.

The vertical plunger 159 is capable of exerting a force substantially in excess of that consistently obtainable by human strength and, consequently, the confections can be lifted out of the mold considerably "dryer" than where manual defrosting is used. In many instances, for example, where the automatic mold defroster of my invention is utilized, the defrosted confections are so chill or congealed or "dry" that no further drying or chilling in a chilling chamber is required, even for subsequent chocolate dipping.

The top-most position of the plunger and carrier is carefully selected so that the bottom of the supporting pins 37 projecting outwardly from each of the ears 34 of the stick holder is at substantially the same elevation as the top of a pair of support bars 181 conveniently fabricated from angle irons, and which appear most clearly in Figures 3, 5 and 6. The support bars are shown in horizontal attitude but may assume any inclination desired. The left ends of the support bars conveniently overlap the right ends of the carrier arms so that as the stick holder is moved away from the arms and toward the support bars there is no possibility that the stick holder will be unsupported at any time. There is a consequently smooth transition from the support offered by the carrier arms to the transverse rods 35 and 36 to the support given the pins 37 by the support bars 181. Agitation of the stick holder and the relatively fragile depending confections is thereby avoided.

The stick holder is slid off the carrier arms and onto the longitudinal support bars by the force exerted by a lug 182 projecting outwardly from an endless sprocket chain 183 reeved about a sprocket wheel 184. As the lug 182 proceeds from the sprocket wheel along the lower run of the chain, the lug abuts the transverse rod 36 of the stick holder and pushes the rod toward the right, as appears in Figures 3 and 6, and in the direction indicated by the arrow 185 in Figure 5.

Located between and slightly below the support bars is a switch 186 having a switch arm 187 projecting upwardly for contact with the bottom of the stick holder as the stick holder advances toward the right, as most clearly appears in Figure 3.

Switch 186, quite similar to switches 144 and 165, has two pairs of contacts, one pair 186A being normally closed and 186B being normally open. As contact is made with the arm 187, rocking the arm toward the right, the contact connections of the switch are reversed, opening contacts 186A and closing contacts 186B. As contacts 186B are closed, the appropriate one of the solenoid coils in the solenoid 67 is energized, and, in turn, the valve 66 is positioned to permit air flow into the instroke piping 64, causing the plunger 62 and the yoke 52 to move downwardly. By adjusting the flow control valve, the speed of withdrawal of the yoke arms can be fixed. The speed is so adjusted that the wedges 56 and 57 at the top of the yoke arms retract to a position at or just below the top of the conveyor belt at approximately the same instant the rear or trailing edge of the stick holder releases the switch arm 187, allowing the spring in the switch 186 to return the arm 187 to its customary or normal position under spring control.

At the instant the wedges 56 and 57 retract into their position below the top of the belt, the belt is allowed to advance the remaining molds toward the stop plate, the second mold then becoming the new first or leading mold. As the new first or leading mold contacts the switch button 71 of the switch 72 and closes the switch contacts, the solenoid 67 is again activated so as to cause the yoke arms again to rise into their mold separating and holding position, as heretofore described, and separating the new leading mold from the subsequent molds.

As clearly appears in Figure 9, closing of the contacts in the switch 72 simultaneously energizes an appropriate one of the solenoid coils in the solenoid 151, and in turn that solenoid appropriately activates the four-way valve 152, causing air to flow into outstroke piping 153, with resulting lowering of the plunger 159 and attached mold carrier from its topmost position downwardly toward its mold-loading position.

The mold carrier proceeds downwardly and is stopped in the proper mold-loading position by abutment of the switch bar 162 with the spring-loaded switch arm 172 on a load positioning switch 193.

The switch 193 resembles the double-pole, double-throw switches heretofore described and has one pair of contacts 193A in normally closed position, under conditions of spring control, and another pair of contacts 193B in normally open position.

As the switch bar 162 abuts the switch arm 172, and depresses the arm 172 against spring pressure, the normally obtaining contacts are reversed and the normally closed contacts 193A are opened. This de-energizes the appropriate one of the coils in the vertical plunger solenoid 151 and the downwardly moving plunger is brought to a halt with the mold carrier in position for being loaded.

At the same instant, contacts 193B are closed, energizing an appropriate one of the solenoid coils in the solenoid 84, which, in turn, through the valve 83, causes air to flow into the outstroke piping 79 leading to the mold loading cylinder 78, and results in motion of the plunger 77 toward the left, as shown in Figure 3.

The plunger 77 in moving to the left, pushes the adjacent new leading mold ahead of it. As appears most clearly in Figure 6, the new stick mold, shown in position on the float platform in Figure 6, pushes ahead of it the now empty mold 196, shown in outline, which moves on to the conveyor 20 to be carried away. Figure 4 shows most clearly how the beveled portions 102 of the float platform jaws are abutted by the now empty mold's trailing vertical frame members 106 (shown in outline) and are cammed outwardly as the empty mold is pushed ahead of the new leading mold. The jaws are cammed out and are held out by the vertical frame members of the empty mold and the new, advancing stick mold until the new stick mold is in position and then, as described above, the jaws snap inwardly through the openings in the sides of the mold.

As the new stick mold comes to a stop in its predetermined position on the float platform and on the carrier arms, the normal or spring-controlled position of the switch 144, as heretofore described, is reversed. The effect of the switch 144 reversal is not only again to start the downward travel of the vertical plunger in the way described in connection with the first mold loading, but is also to energize the appropriate coil, as appears in Figure 9, in solenoid 84. This, in turn, effects withdrawal of the plunger 77 toward the right and to its base or closed position.

The return of the plunger 77 to its base position is therefore accompanied by renewal of downward travel of the mold carrier. A very slight downward movement of the mold carrier is sufficient to disengage the sharp edge 198 of the switch bar 162 from the arm 172 of the switch, the position of the arm just prior to disengagement being shown in outline and designated in Figure 6 by numeral 199. Upon disengagement of the switch arm 172, the arm is returned to its normal or spring controlled position shown in full line in Figure 6 and the switch 193 is correspondingly returned to its normal condition. The first cycle has therefore been completed and the second cycle of automatic defrosting has commenced.

What is claimed is:

1. A mold defroster comprising a vertically acting plunger, a mold carrier on said plunger including a pair of arms engageable on the upper sides thereof with a frozen confection stick holder and on the lower sides thereof with a frozen confection mold, a defrosting tank disposed below said mold carrier, means for lowering said plunger and said mold carrier whereby said stick holder and said mold are immersed in said defrosting tank for a predetermined length of time, means for raising said plunger and said mold carrier whereby said stick holder is elevated to a predetermined vertical position, and a conveyor disposed substantially at said predetermined vertical position for disengagement of said stick holder from said mold carrier.

2. A mold defroster comprising a brine tank for freezing confections in a mold, a mold conveyor adjacent said brine tank, means adjacent one end of said conveyor for positioning said mold at a predetermined location on said conveyor, a defrosting tank adjacent said mold positioning means for containing a heated fluid, means disposed at the top of said defrosting tank and in registry with said mold positioning means for clamping said mold, means for urging said mold from said predetermined location on said conveyor toward and into engagement with said registering mold clamping means, means for immersing said mold into said defrosting tank for a predetermined length of time whereby the bond between said mold and said confection is broken, and means for transporting said confection to a location remote from said mold after said bond is broken.

3. The mold defroster of claim 2 wherein said mold conveyor is further characterized by an endless belt adapted to carry the frozen confection mold from a location adjacent said brine tank to a location adjacent said mold positioning means, said positioning means including an electrical switch activated by abutment with the mold as the mold reaches said predetermined location on said conveyor.

4. The mold defroster of claim 2 wherein said mold conveyor adjacent said brine tank is additionally characterized by an endless carrier adapted to receive and support the frozen confection mold as the mold is discharged from said brine tank, said carrier being movable toward said mold positioning means with the mold located thereon.

5. A mold defroster comprising a defrosting tank for containing a heated liquid, a float supportable by said liquid, said float including a buoyant member and mounted on top of said buoyant member a mold clamping member resistant to vertically upward dislodgement of a mold clamped in said mold clamping member, a vertically acting plunger disposed above said defrosting tank, a mold carrier mounted on said plunger and movable thereby from a first position adjacent the top of said mold in buoyantly supported location, to a second position whereby said mold and the frozen confections formed in said mold are immersed in said heated liquid, and to a third position above said first position and remote from said mold.

6. An automatically controlled mold defroster comprising cyclical means for stopping in a predetermined position a mold and frozen confection cast therein, a defrosting tank adjacent said positioning means, means for transporting said mold and confection from said positioning means to a location above said defrosting tank, means for immersing said mold and confection into said tank, means for lifting said mold and confection out of said tank, means for separating said confection from said mold, and means for conveying said confection and said mold to locations remote from said defrosting tank and from each other.

7. An automatically controlled mold defroster comprising a conveyor effective to transport a plurality of frozen confection molds, a vertical plate adjacent the discharge end of said conveyor for contacting and stopping the leading one of said plurality of molds, a relay switch mounted on said plate and actuated by said contact with said leading mold, means connected with said relay switch for separating said leading mold from the following of said molds on actuation of said switch, a mold carrier adjacent one end of said leading mold when in said position of contact, a first plunger adjacent the other end of said mold when in said position of contact, means for translating said first plunger into contact with said leading mold and moving the same in a direction away from said plate and into engagement with said mold carrier, a second plunger disposed above said mold carrier and fastened thereto, a defrosting tank disposed below said mold carrier, means for translating said second plunger and said mold carrier downwardly for immersion of said leading mold in said tank, means for translating said second plunger upwardly, and means for de-activating said separating means whereby the next of said plurality of molds contacts said vertical plate.

8. A mold defroster comprising a defrosting tank, a float vertically movable in said tank, clamping means mounted on said float for holding a frozen confection mold against vertically upward translation relative thereto, a mold carrier interposable between the mold and a stick holder in the mold, and a vertically acting plunger mounted on said mold carrier, said plunger being capable of depressing said mold carrier, said mold and said float in said tank in one direction of motion and of separating said mold carrier and the stick holder from the mold in the other direction of motion.

References Cited in the file of this patent

UNITED STATES PATENTS

| | | |
|---|---|---|
| 1,959,215 | Owen | May 15, 1934 |
| 2,374,535 | Gibson | Apr. 24, 1945 |
| 2,385,264 | Ferris | Sept. 18, 1945 |
| 2,537,904 | McAllister | Jan. 9, 1951 |
| 2,632,453 | Friedman | Mar. 24, 1953 |
| 2,637,668 | Eftihios | May 5, 1953 |
| 2,670,746 | Kearney | Mar. 2, 1954 |